Dec. 1, 1964

G. O. FREDRICKSON 3,159,779

MOTOR CONTROL CIRCUIT

Filed May 18, 1961

INVENTOR.
Gustav O. Fredrickson
BY
Johnson and Kline
ATTORNEYS

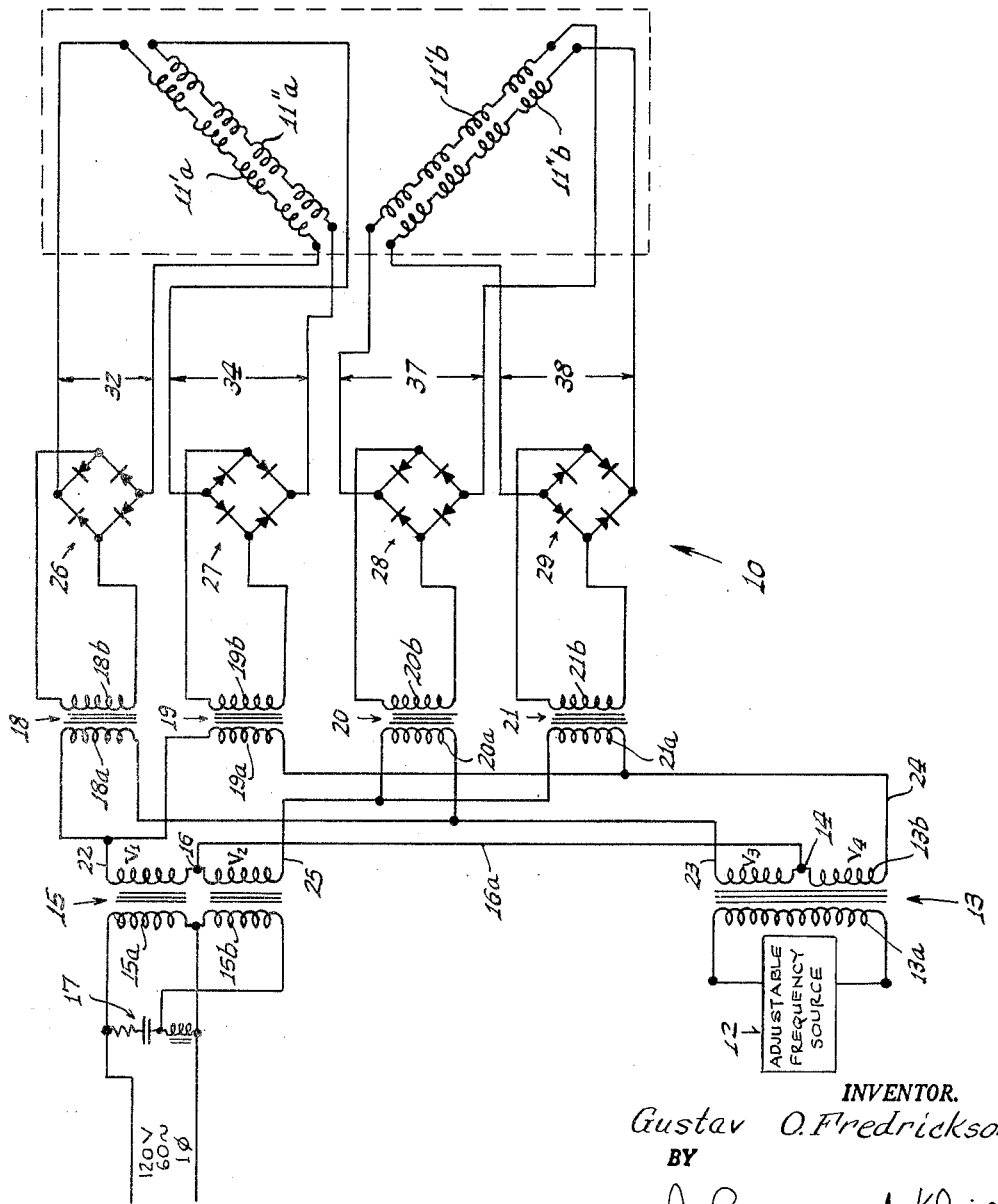

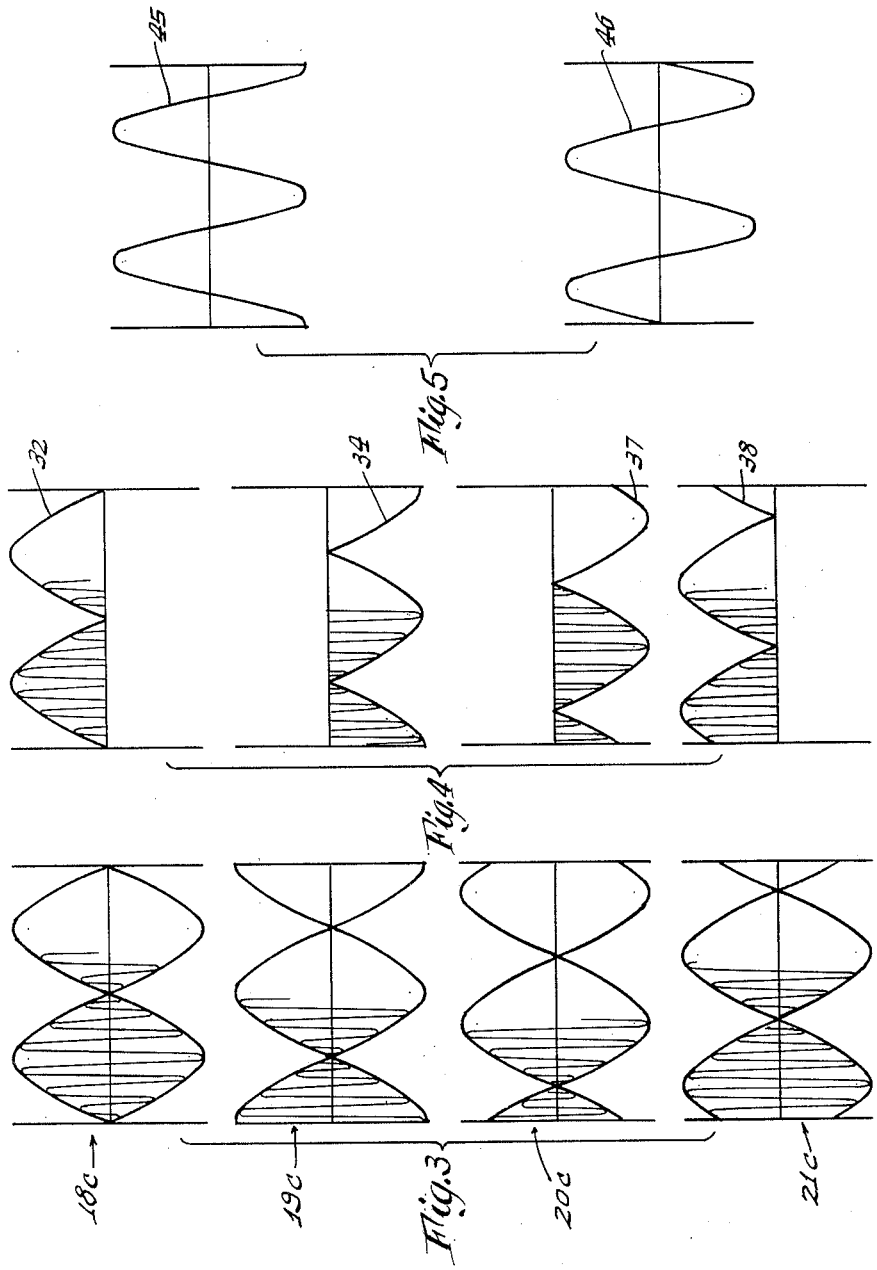

United States Patent Office 3,159,779
Patented Dec. 1, 1964

3,159,779
MOTOR CONTROL CIRCUIT
Gustav O. Fredrickson, Southington, Conn., assignor to The Superior Electric Company, Bristol, Conn., a corporation of Connecticut
Filed May 18, 1961, Ser. No. 111,022
9 Claims. (Cl. 318—171)

The present invention relates to a motor control circuit for controlling the speed and rotation of a synchronous inductor motor and more particularly to a control circuit which enables the speed and direction of rotation of the motor to be adjusted.

The type of motor that is employed with the motor control circuit of the present invention hereinafter specifically set forth is disclosed in U.S. Patent 2,105,514. This motor includes a permanently magnetized rotor that is rotationally moved by changes in the polarity of magnetization of stator poles. There is a winding means on each stator pole and the polarity of magnetization of the pole is controlled by the direction and value of the current in the winding means if the winding means consists of one winding, as in the above-mentioned patent. However, if as shown in a further embodiment of the invention herein disclosed, the winding means consists of two independent winding coils on each pole, the resulting pole magnetization is the alegbraic sum of the magnetic effects produced by the current in each winding with the control circuit varying the value of current in the two windings to effect changes in the pole magnetization.

In both embodiments the speed of the motor is determined by the frequency of the change of the current in the winding means such that a faster frequency produces faster rotation. Direction of rotation is determined by the time relation of the magnetic fluxes in the stator poles. Furthermore, at standstill when the rotor is held stationary, current to the pole windings is in effect a fixed direct current which results in a holding torque that is equal to the running torque of the motor. Moreover, the rotor can be stopped at any rotative position thereof and held stationary thereat with this fixed torque. From this fixed static position, the rotor can be caused to rotate in either direction by adjusting the time relation between the fluxes in the poles.

An object of the present invention is to provide a motor and motor control circuit in which the speed and direction of rotation are effected electrically and may be easily and quickly adjusted or held stationary at full torque at any desired rotative position.

A further object of the present invention is to achieve the above objects with few if any mechanically moving parts in the control circuit and yet provide for a relatively large range of speeds.

Another object of the present invention is to provide a motor control circuit which is reliable and durable in operation, simple in construction and easily interconnected with the motor which it controls.

In carrying out the present invention there is provided a synchronous inductor motor of the type above mentioned which when operated at an alternating current of 60 cycles per second produces a rotational speed of 72 r.p.m. The rotational speed is controlled by the frequency and the present invention involves providing a frequency of energization to the motor which may be easily varied. This is accomplished by providing a first input that is connected to a constant frequency source and of intermixing with this frequency another alternating current in which the frequency may be easily varied, as for example an adjustable frequency generator. The motor control circuit intermixes the two frequencies and applies the beat frequency current to the motor windings in the proper sequence and phase to effect rotation at a speed determined by the beat frequency. Thus if the two phase source is 60 cycles per second and the frequency of the adjustable source is 59 cycles per second then the beat frequency would be one cycle per second which would produce a little more than one revolution per minute of the motor at full torque.

Moreover, according to the present invention, for reversing the rotation of the motor the frequency of the adjustable frequency source is made larger than the two phase frequency and hence as the beat frequency passes through its no frequency position the motor will reverse its direction of rotation because of the change in the time relationship between the currents to the two poles.

Other features and advantages will hereinafter appear.

In the drawing:

FIG. 2 is an electrical schematical diagram of the motor control circuit and of a motor in which each stator pole winding means consists of two independent winding coils.

FIG. 3 is a diagrammatic representation of the beat frequency voltage after intermixing of the two input frequency voltages.

FIG. 4 is a diagrammatic representation of the beat frequency voltage after rectification.

FIG. 5 is a diagrammatic representation of the wave applied to the winding means of the motor shown in FIG. 1.

Figure 1:
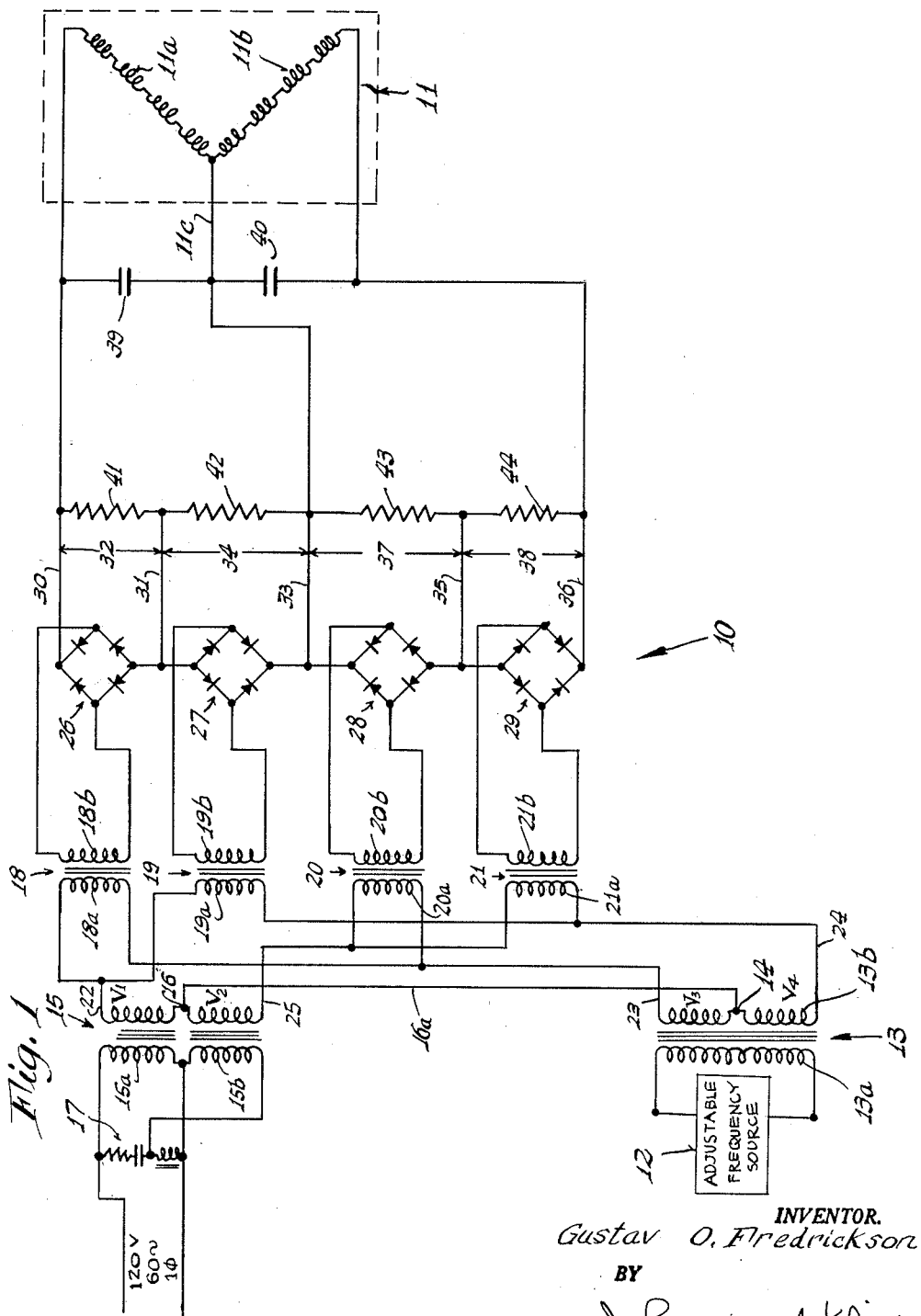
FIGURE 1 is an electrical schematical diagram of the motor control circuit and a motor of the type disclosed in the above-mentioned patent.

Referring to the drawing, particularly Fig. 1, the motor control circuit of the present invention is generally indicated by the reference numeral 10 and includes a motor indicated by the reference numeral 11 and shown contained within dotted lines. The motor is preferably of the type disclosed in the above-mentioned patent with eight stator poles and the winding means for the stator poles are divided into two winding sets 11a and 11b with each set including four windings as diagrammatically illustrated. One end of each of the winding sets is joined to a common lead 11c. A source 12 of single phase adjustable frequency alternating current, such as may be advantageously obtained from an adjustable frequency generator, is connected to a primary winding 13a of a transformer 13 with the secondary winding 13b being center tapped as at 14.

A transformer 15 having primary windings 15a and 15b is connected to a two phase source of any conventional design and while for example the two phase source may be obtained from three phase alternating current, in the present embodiment of the invention it is obtained from a single phase, 60 cycle alternating current source using an impedance network 17 to energize the winding 15a with voltage 90 electrical degrees from the voltage in winding 15b. The voltages have a constant frequency, i.e. 60 cycles in both phases. The secondary winding of the transformer 15 has a tap 16 and that is connected by a lead 16a to the tap 14 of the transformer winding 13b.

For intermixing the voltage to produce the beat frequency there are provided transformers 18, 19, 20 and 21, all of similar design. The primary winding 18a of the transformer 18 is connected to have a voltage $V_1$ with the voltage $V_1$ being obtained between the center tap 16 and a lead 22 connected to one of the windings in the secondary winding of the transformer 15 and a voltage $V_3$ obtained between a lead 23 and the center tap 14 of the transformer winding 13b. Winding 19a is connected to have the voltage $V_1$ plus a voltage $V_4$ impressed thereon with the voltage $V_4$ being taken between a lead 24 and the center tap 14. Between a lead 25 and the center tap 16 a voltage $V_2$ is developed that is impressed on the primary winding 20a of transformer 20 in addition to the voltage $V_3$ while the transformer winding $21a$ of transformer $21$ has impressed thereacross the voltage $V_2$ and the voltage $V_4$.

Shown in FIG. 13 are the resultant wave shapes of the voltages across the secondary windings of the transformers 18 through 21 and denoted $18c$ through $21c$ respectively with the numeral indicating the transformer winding. The frequency of each of these voltages is the beat frequency of the voltages from the adjustable frequency source and the constant frequency source as applied to the transformers 13 and 15. The magnitude of $V_1$ is substantially equal to the magnitude of $V_3$ while $V_2$ is substantially equal to $V_4$ and hence the magnitude of the resultant voltage is the sum of $V_1$ plus $V_3$ when the two frequencies coincide while it is zero when they directly oppose each other with the shape of the wave being a relatively smooth curve.

Voltage wave $19c$ has the same magnitude and characteristics as voltage wave $18c$ but is 90 electrical degrees out of phase therewith by reason of $V_3$ being 180 degrees out of phase with $V_4$. Similarly waves $20c$ and $21c$ have the same characteristics and magnitude as wave $18c$ but as to each other are 180 degrees out of phase. Moreover by reason of the voltage $V_2$ being 90 electrical degrees out of phase with $V_1$ the phase of the waves $20c$ and $21c$ is 90 degrees removed from the phase of waves $18c$ and $19c$ respectively.

The secondary winding $18b$ of the transformer 18 is connected to a full wave rectifier 26 as are the windings $19b$, $20b$ and $21b$ connected to full wave rectifiers 27, 28 and 29 respectively. The output of the rectifier 26 is through a path including leads 30 and 31 with the voltage wave across these leads being indicated in FIG. 4 by the reference numeral 32. The output of the rectifier 27 is between a path including leads 31 and 33 with this voltage wave being indicated by the reference numeral 34 on FIG. 4. Similarly the output of rectifier 28 is between a path defined by leads 33 and 35 while the output of rectifier 29 is between a path defined by leads 35 and 36 with the voltage waves being indicated on FIG. 4 as 37 and 38 respectively.

The lead 30 is connected to one end of the winding set $11a$ while the common lead $11c$ of the winding sets is connected to the lead 33. The winding set $11b$ is between the lead 33 and the lead 36. Condensers 39 and 40 are provided to reduce output ripple while resistors 41, 42, 43 and 44 provide current feedback paths for the direct current power supplies.

Thus with the motor and motor control circuit shown, the voltage impressed on the winding set $11a$ is shown in FIG. 5, indicated by the reference numeral 45, and is an alternating voltage while the winding impressed across the winding set $11b$ is denoted in FIG. 5 by reference numeral 46 and is also an alternating voltage. Moreover the two voltages are substantially identical with the exception that the voltage 46 is 90 degrees out of phase with the voltage 45.

As disclosed in the above-mentioned patent, the motor 11 is of the type that is a synchronous inductor motor having a plurality of teeth on both the rotor and the stator which cooperate to gradually move the rotor one tooth pitch upon a gradual change in the magnetization of the stator poles. Since the voltage wave impressed on the winding sets has a frequency equal to the beat frequency of the frequencies of the two voltage sources the motor will be caused to smoothly rotate at this beat frequency. Naturally by changing the variable frequency source to have a different frequency the voltage impressed on the winding sets will be different and hence if a greater frequency, will increase the speed of the motor while if of less frequency, will decrease the speed of the motor.

Referring to FIG. 2 in the further embodiment of this invention, the adjustable frequency source transformer 13, two phase constant frequency source transformer 15, transformers 18 through 21 and rectifiers 26 through 29 are identical to the previously disclosed embodiment as are other components given the same reference character. However in this embodiment of the invention the motor is of the type which has a winding means composed of two winding coils on each pole. Each of the winding coils are electrically connected in the manner shown to form winding sets $11'a$ and $11''a$ and $11'b$ and $11''b$ which are energized with unidirectional voltage but since the winding coils are wound oppositely on their stator pole, the algebraic sum of the magnetizing effect of each of the two windings on a pole is the resultant magnetization of the pole. Thus this embodiment of the invention provides for combining the voltages from rectifiers 26 and 27 and 28 and 29 within the motor by algebraically adding their magnetizing effect while in the previously disclosed embodiment the voltages were combined exteriorly of the motor and applied to one winding for each pole.

In the operation of the circuit the frequency, as above noted, may be varied by the adjustment of the adjustable frequency source 12. In order to effect rotation in one direction the energization of the windings should be as in the following table wherein plus indicates a north and minus a south of a pole in the winding sets. It will of course be appreciated that the polarity of magnetization of the poles according to the present invention is changed sinusoidally as shown by the waves 45 and 46 and not instantly switched from one maximum polarity to the other.

| Steps | Winding Set $11a$ | Winding Set $11b$ |
|---|---|---|
| 1 | + | + |
| 2 | + | − |
| 3 | − | − |
| 4 | − | + |
| 5 | + | + |
| etc. | etc. | etc. |

The rotor is maintained stationary with full holding torque by having the same frequency present from the adjustable frequency source 12 and the transformer 15 and hence in effect energizes the pole winding means with direct current. To rotate the rotor in the opposite direction, the frequency is altered on the other side of the same frequency point and the motor will be energized in the following sequence:

| Steps | Winding Set $11a$ | Winding Set $11b$ |
|---|---|---|
| 1 | + | + |
| 2 | − | + |
| 3 | − | − |
| 4 | + | − |
| 5 | + | + |
| etc. | etc. | etc. |

It will thus be seen that in both directions the change in magnetization of the poles is the same with a change in rotational direction being achieved by shifting the time phase relationship between the two winding sets $11a$ and $11b$ such that for one direction of rotation the effective current in the winding set $11c$ leads the current in the winding set $11b$ while with a reverse rotative direction, the opposite relation is true.

It will be clear that with the present construction of motor and control circuit therefor, that the rotor may be stopped at any of its rotative positions by making the two input frequencies the same. Moreover, by slight changes of the frequency of the adjustable frequency source on either side of the frequency of the first voltage source, the rotor may be infinitesimally moved and held about its prior stopping point with the movement of the rotor being gradual and not stepping.

It will accordingly be appreciated that there has been disclosed a motor control circuit and motor which in both embodiments provides for both control of the speed of the motor and the direction of rotation. The motor control is composed of electrical elements that are reliable and durable and have no moving parts. Changes in the speed and direction of rotation are easily accomplished simply by varying the frequency of one input source to the motor control with respect to a second frequency source.

Variations and modifications may be made within the scope of the claims and portions of the improvements may be used without others.

I claim:

1. A motor control circuit for a motor having at least a first pole and a second pole with each pole having a winding means with changes in the energization of the winding means changing the magnetic polarity of its pole comprising a first voltage input means connectible to a two phase alternating current source, a second voltage input means connectible to a source of alternating current having a frequency different than the frequency of the two phase alternating current source, means connected to the first voltage input means and the second voltage input means for combining these voltages and means for impressing the beat frequency of the combined voltages on the winding means of the motor.

2. A motor control circuit for a motor having at least a first pole and a second pole with each pole having a winding means with changes in the energization of the winding means changing the magnetic polarity of its pole comprising a first voltage input means connectible to a two phase alternating current source, a second voltage input means connectible to a source of adjustable frequency alternating current normally having a frequency different than the frequency of the two phase source, means connected to the first voltage input means and the second voltage input means for combining these voltages and means for impressing the beat frequency of the combined voltages on the winding means of the motor.

3. A motor control circuit for a motor having at least a first pole and a second pole with each pole having a winding means with changes in the energization of the winding means changing the magnetic polarity of its pole comprising a first voltage input means connectible to one phase of a two phase alternating current source, a second voltage input means connectible to the other phase, a third voltage input means connectible to a source of adjustable frequency alternating current, means connected to the first voltage input means and the third voltage input means for combining these voltages, means for impressing the beat frequency of the combined voltages on the winding means of the first pole, and means connected to the second voltage input means and the third voltage input means for combining these voltages and means for impressing the beat frequency of these combined voltages on the winding means of the second pole.

4. A motor control circuit for a motor having at least a first pole and a second pole with each pole having a winding means with changes in the energization of the winding means changing the magnetic polarity of its pole comprising a first voltage input means connectible to one phase of a two phase alternating current source, a second voltage input means connectible to the other phase, a third voltage input means connectible to a source of adjustable frequency alternating current, and including means for providing a voltage in phase with the source and another voltage substantially 180 electrical degrees out of phase with the source, means connected to the first voltage input means and the inphase voltage means of the third voltage input means for combining these voltages and means for impressing the beat frequency of the combined voltages on the winding means of the first pole, and means connected to the second voltage input means and the out-of-phase voltage means of the third voltage input means for combining these voltages and means for impressing the beat frequency of these combined voltages on the winding means of the second pole.

5. A motor control circuit for a motor having at least a first pole and a second pole with each pole having a winding means with changes in the energization of the winding means changing the magnetic polarity of its pole comprising a first voltage input means connectible to one phase of a two phase alternating current source, a second voltage input means connectible to the other phase, a third voltage input means connectible to a source of adjustable frequency alternating current, means connected to the first voltage input means and the third voltage input means for combining these voltages and means for impressing the beat frequency of the combined voltages on the winding means of the first pole, and means connected to the second voltage input means and the third voltage input means for combining these voltages and means for impressing the beat frequency of the combined voltages on the winding means of the second pole, said beat frequency voltages being substantially 90 electrical degrees out of phase.

6. A motor control circuit for a motor having at least a first pole and a second pole with each pole having a winding means with changes in the energization of the winding means changing the magnetic polarity of its pole comprising a first voltage input means connectible to one phase of a two phase alternating current source, a second voltage input means connectible to the other phase, a third voltage input means connectible to a source of adjustable frequency alternating current and including means for providing a voltage in phase with the source and another voltage substantially 180 electrical degrees out of phase with the source, means connected to the first voltage input means and the inphase voltage means of the third voltage input means for combining these voltages and means for impressing the beat frequency of the combined voltages on the winding means of the first pole, and means connected to the second voltage input means and the out-of-phase voltage means of the third voltage input means for combining these voltages and means for impressing the beat frequency of the combined voltages on the winding means of the second pole, and in which each of the impressing means includes two paths, the beat voltage in one path being substantially 180 electrical degrees out of phase with the beat voltage in the other path.

7. The invention as defined in claim 6 in which the winding means for each pole includes two windings, and each of the impressing means includes connections connecting one path of one impressing means to one winding of a pole and the other path of the same impressing means to the other winding of the same pole.

8. The invention as defined in claim 6 in which each of the paths in each of the impressing means includes a means for producing unidirectional voltage in the path, the voltages in the two paths of each of the impressing means being of opposite polarity.

9. The invention as defined in claim 8 in which the winding means for each pole includes two winding coils and in which one path of one impressing means is connected to one winding coil of one pole and the other path of the same impressing means is connected to the other winding coil of the same pole and the winding coils of the other pole are similarly connected to the paths of the other impressing means.

References Cited in the file of this patent

UNITED STATES PATENTS

| 2,932,778 | Curtis | Apr. 12, 1960 |
| 2,976,470 | Krassoievitch et al. | Mar. 21, 1961 |